(12) United States Patent
Kiesow

(10) Patent No.: US 9,132,867 B1
(45) Date of Patent: Sep. 15, 2015

(54) RACK AND CLOTHES LINE COMBINATION ATTACHABLE TO A RECREATIONAL VEHICLE

(71) Applicant: Daniel D. Kiesow, Brillion, WI (US)

(72) Inventor: Daniel D. Kiesow, Brillion, WI (US)

( * ) Notice: Subject to any disclaimer, the term of this patent is extended or adjusted under 35 U.S.C. 154(b) by 0 days.

(21) Appl. No.: 14/255,546

(22) Filed: Apr. 17, 2014

Related U.S. Application Data

(60) Provisional application No. 61/933,963, filed on Jan. 31, 2014.

(51) Int. Cl.
  *B62D 33/08* (2006.01)
  *B62D 33/02* (2006.01)
  *B62D 33/03* (2006.01)
  *B62D 33/023* (2006.01)

(52) U.S. Cl.
  CPC ............ *B62D 33/08* (2013.01); *B62D 33/0207* (2013.01); *B62D 33/023* (2013.01); *B62D 33/03* (2013.01)

(58) Field of Classification Search
  CPC .... B62D 33/08; B62D 33/10; B62D 33/0207; B62D 33/023; B62D 33/03
  See application file for complete search history.

(56) References Cited

U.S. PATENT DOCUMENTS

| | | | |
|---|---|---|---|
| 1,587,676 A | 6/1926 | Patterson | |
| 3,854,641 A | 12/1974 | Kohls | |
| 4,247,030 A * | 1/1981 | Amacker | 224/401 |
| 4,277,008 A * | 7/1981 | McCleary | 224/401 |
| 4,856,661 A | 8/1989 | Guillen et al. | |
| 5,105,954 A | 4/1992 | Dahlquist | |
| 5,269,446 A | 12/1993 | Biehn | |
| D364,140 S | 11/1995 | Gustavsen | |
| 5,853,156 A * | 12/1998 | Moore et al. | 248/210 |
| 6,378,748 B1 * | 4/2002 | Cox | 224/511 |
| 6,502,728 B2 | 1/2003 | Savant | |
| 7,128,341 B1 * | 10/2006 | Dahl et al. | 280/769 |
| 7,886,918 B1 | 2/2011 | Sauer et al. | |
| 8,474,561 B2 * | 7/2013 | Allingham | 180/89.11 |
| 2005/0092800 A1 * | 5/2005 | Wilson | 224/513 |
| 2008/0061203 A1 | 3/2008 | Riker et al. | |
| 2008/0240897 A1 * | 10/2008 | Miro et al. | 414/462 |
| 2009/0065543 A1 | 3/2009 | Bone | |
| 2010/0213228 A1 * | 8/2010 | Dannewitz | 224/401 |
| 2014/0255136 A1 * | 9/2014 | Malcolm et al. | 414/477 |

FOREIGN PATENT DOCUMENTS

WO 2008141364 A1 11/2008

OTHER PUBLICATIONS http://www.pvcplans.com/Clothesline%20on%20RV.JPG Accessed Jul. 25, 2013.

* cited by examiner

*Primary Examiner* — Brian D Nash
(74) *Attorney, Agent, or Firm* — Robert C. Montgomery; Montgomery Patent & Design, LLC

(57) ABSTRACT

A rack adapted to be attached to a recreational vehicle further has a pivoting clothes line support assembly. The rack comprises a vertical back stop and a horizontal platform attached perpendicularly thereto. A vertical bar is positioned at the center of the back stop and is provided with a fastening mechanism to secure a spare tire to the rack. The clothes line support assembly is pivotally attached to the rack to be stowed in an up position and deployed for use at an angled position to the normal. The rack is secured to a rear portion of a recreational vehicle and used to transport ancillary items as well as serve as a clothes line during camping.

19 Claims, 9 Drawing Sheets

RACK AND CLOTHES LINE COMBINATION ATTACHABLE TO A RECREATIONAL VEHICLE

RELATED APPLICATIONS

The present invention was first described in and claims the benefit of U.S. Provisional Application No. 61/933,963, filed Jan. 31, 2014, the entire disclosures of which are incorporated herein by reference.

FIELD OF THE INVENTION

The present invention relates generally to a rack adapted to be attached to a recreational vehicle, the rack having a pivoting clothes line support assembly.

BACKGROUND OF THE INVENTION

Millions of Americans enjoy camping and traveling as their preferred leisure time activity. Among these avid campers, a great deal choose to do so in recreational vehicles ("RV's") that range in size from small pop-up campers, that are designed to be towed behind a car or truck, to large motorized RV's with integral engines. However, no matter how large an RV is, there never seems to be enough storage room. This is especially the case when large, bulky items such as firewood and bicycles are being transported. Another area where RV's seem to suffer is where wet clothing and towels can be hung to dry. While a clothesline can be strung, many RV parking locations do not have trees or other suitable areas from which to hang a clothes line. Also, should a clothesline be strung, it quickly becomes a danger to people who may be walking at night in an unfamiliar location. Accordingly, there exists a need for a means by which extra storage space, as well as a location to dry wet clothes and towels, can be provided on almost any recreational vehicle. The development of the present invention fulfills this need.

The apparatus is an auxiliary storage platform having an integral back stop frame and pivotally attached support assembly, which is affixed to a rear of a RV. The platform provides a large flat storage to store bicycles, firewood, storage totes, or other items that are too large or cumbersome to store inside the RV or one (1) of its storage compartments. The back stop is configured to removably store a spare tire for the RV. The support assembly is a frame pivotally attached to the back stop via two (2) support arms. The back stop is configured to be substantially parallel with a rear of the RV. The support assembly is configured to rotate from being substantially parallel with the back stop to substantially perpendicular with the back stop; however, it is envisioned for the support assembly to be provided with mechanical stops to limit the rotation to a desired range. With these features, the support assembly is preferably parallel with the back stop and rear of the RV while in a stowed state, and preferably at an acute angle with the back stop and rear of the RV when in a deployed state. When in a stowed state, the apparatus is suitable for carrying loads while the RV is in motion. When in a deployed state, the apparatus is suitable for providing a clothesline and garment rack.

Prior art in this field consists of garment hangers that affix to a sidewall portion of an object, such as a rear panel of a RV, thereby resulting in permanent alteration of a sidewall portion of the RV. Some of these prior art garment hangers are provided with pivotally affixed rods to support hangers when needed. Other prior art garment hangers are provided with extending and retracting structures. Yet, none provide a pivotally attached garment rack that lies substantially flush with the sidewall surface when stowed and obviates permanent alteration to the sidewall portion of the RV. Furthermore, none of these prior art garment hangers are adapted to afford the added utility of having a large storage platform, and accommodations for a spare tire, all while providing an aesthetically pleasing design.

It is an objective of the present invention to provide an apparatus adapted to removably secure to a side or rear of a RV and configured to support a plurality of loads such as garments, tires, bicycles, luggage bags, and other travel items.

It is a further objective of the present invention to provide a garment and travel item rack that is able to rotate out from, and fold up against, a surface of the RV. This is especially important when the RV is in motion so as to not form a hazard for other drivers.

It is a further objective of the present invention to provide a garment and travel item rack that is quickly installed and removed with a minimum of tools and without leaving any telltale marks behind.

It is a further objective of the present invention to provide a garment and travel item rack that accommodates the storage of a spare tire.

It is a further objective of the present invention to enable securement of the apparatus to the RV via the tow hitch assembly of the RV.

It is a further objective of the present invention to provide an alternative securement method of the apparatus to the RV via a bumper mounting assembly.

It is a further objective of the present invention to enable connection to a towed load via a receiver hitch of the apparatus so that the towed load can be transported by the RV while the apparatus is attached.

It is a further objective of the present invention to provide an attractive and sleek configuration to the rack so as to not detract from the aesthetics of the RV and to not create an obstruction to the functionality of the RV.

SUMMARY OF THE INVENTION

The apparatus is a rack, having a platform and a back stop, that is attachable and detachable to an exterior of a RV. The rack is provided with a vertical bar to receive and secure a spare tire thereto. A horizontal, rearward projecting rod is disposed on the vertical bar, and is provided with a threaded clamp to retain a spare tire in a fixed position against the vertical bar. Pivotally attached to the rack is a support assembly that is stowed in an up-right position or deployed in a rotated-out position. The support assembly is provided with a clothes line support structure to suspend items thereon. A horizontal platform extends perpendicularly from the rack, which is provided with a deck. This platform and deck serve as a shelf to hold, and secure thereto via tie-down brackets, any number of travel items.

A first receiver hitch tube is disposed on the platform to facilitate connection to an ancillary trailer hitch of the RV, thereby connecting the apparatus to the RV. A second receiver hitch is disposed on the platform to facilitate connection to an ancillary trailer hitch of a towed load. Mounting brackets are provided with the apparatus, which are affixed to the RV and provide added securement and support for the apparatus when attaching it to the RV. The back stop inserts into the mounting brackets while the first hitch receiver receives the trailer hitch of the RV.

Alternatively, a bumper mounting assembly is used to mount the rack. The bumper mounting assembly affixes to the bumper of the RV, and comprises a plurality of mounting plates and U-bolt fasteners. A central tube is disposed on each mounting plate and used to receive mounting tubes of the back stop.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
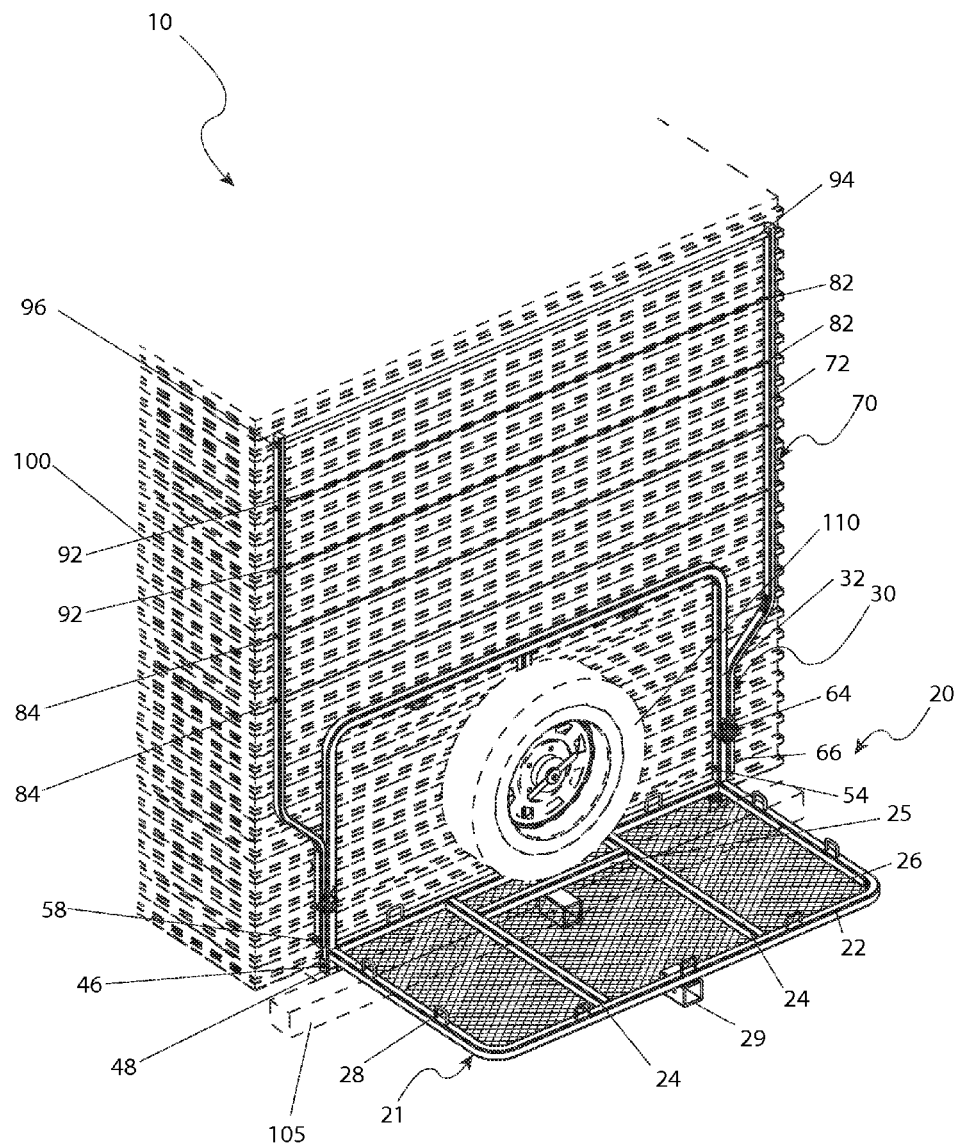
FIG. 1 is an perspective view of a rack and clothes line combination for a recreational vehicle 10 in accordance with the preferred embodiment of the present invention.

DESCRIPTIVE KEY 10 rack and clothes line combination for a recreational vehicle
20 rack
21 platform
22 platform frame
24 platform lateral
25 spanner tube
26 deck
28 tie-down
29 hitch mount
30 back stop
32 back stop frame
34 vertical bar
36 threaded rod
38 threaded clamp
39 handle
42 mounting tube
44 tube aperture
46 mounting pin
48 pin retainer
52 first pivot aperture
54 pivot pin
56 spacer
58 pivot pin retainer
62 arm stop
64 support chain
65 first latch aperture
66 latch pin
68 latch pin retainer
70 support assembly
72 support arm
74 second pivot aperture
76 second latch aperture
78 arm offset
79 straight portion
82 first line aperture
84 second line aperture
86 first tie rod aperture
88 second tie rod aperture
92 support line
93 knot
94 tie rod
96 tie rod retainer
98 mounting bracket
99 mounting bracket aperture
100 recreational vehicle
105 bumper
110 spare tire
120 item to dry
130 bumper mounting assembly
131 mounting plate
132 plate aperture
133 central tube
134 pin aperture
135 "U"-bolt
136 nut

DETAILED DESCRIPTION OF THE PREFERRED EMBODIMENT

Figure 5:
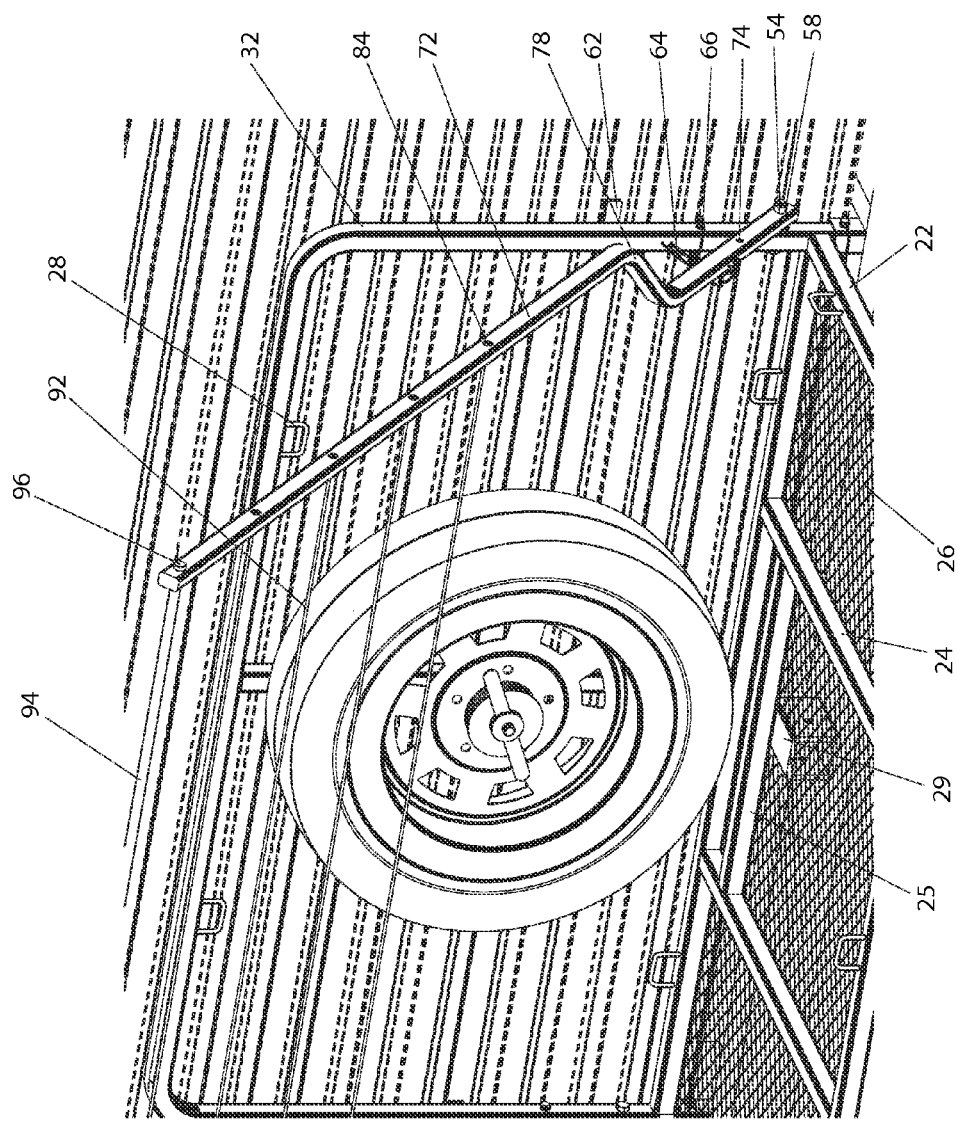
FIG. 5 is an enlarged view of selected portions of the rack and clothes line combination for a recreational vehicle 10 depicted with the clothes line support assembly 70 in a deployed position in accordance with the preferred embodiment of the present invention.
Figure 6A:
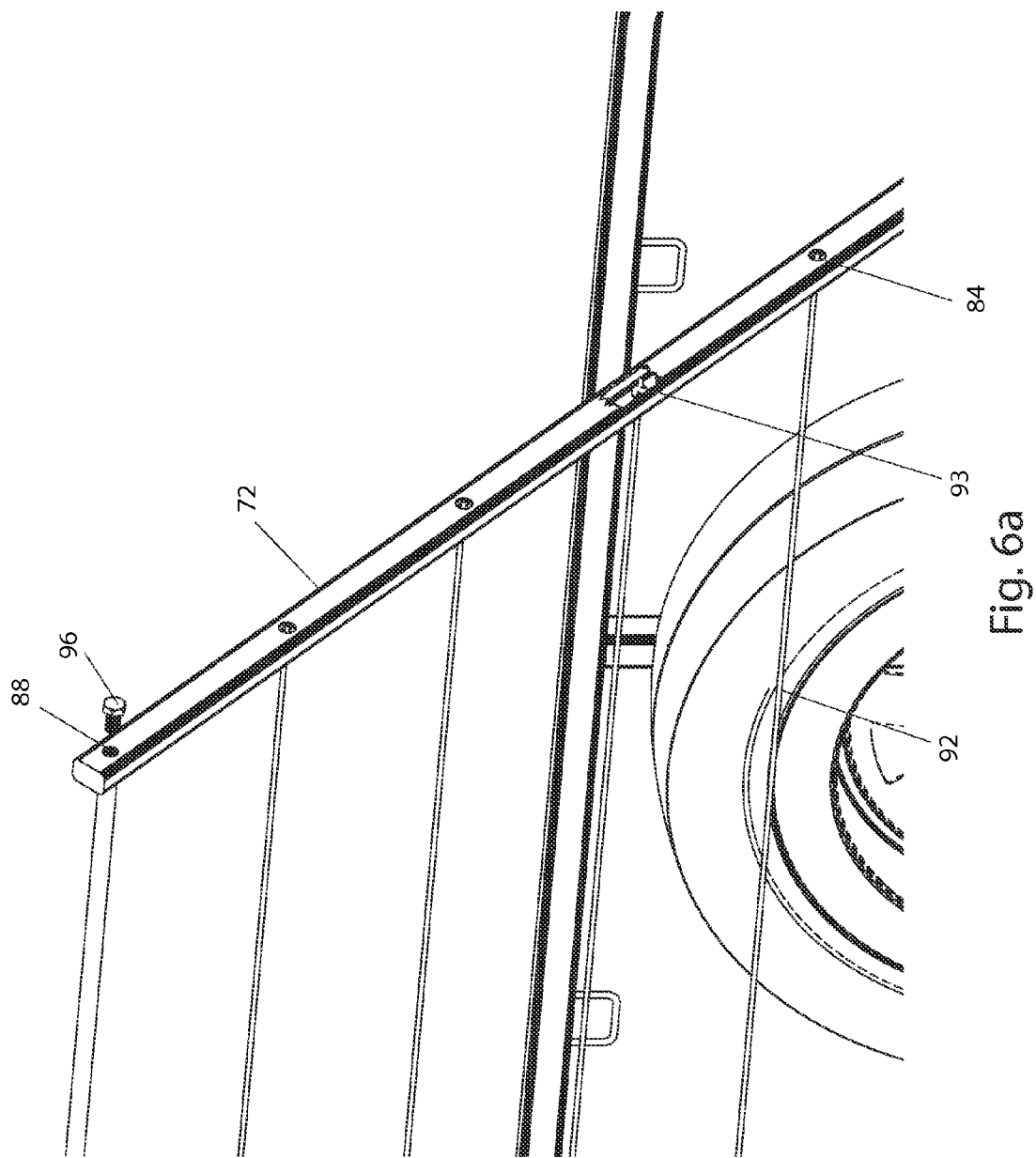
FIG. 6a is an enlarged view of the support arm 72 of the rack and clothes line combination for a recreational vehicle 10 in accordance with the preferred embodiment of the present invention.
Figure 6B:
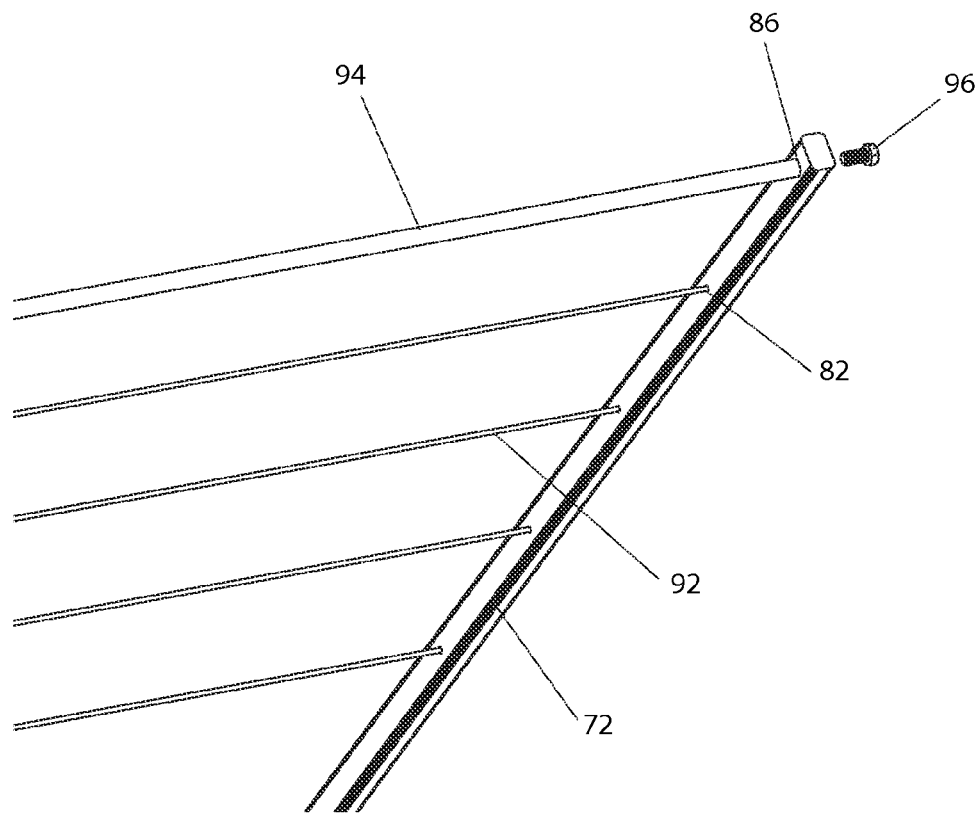
FIG. 6b is another enlarged view of the support arm 72 of the rack and clothes line combination for a recreational vehicle 10 in accordance with the preferred embodiment of the present invention.
Figure 7:
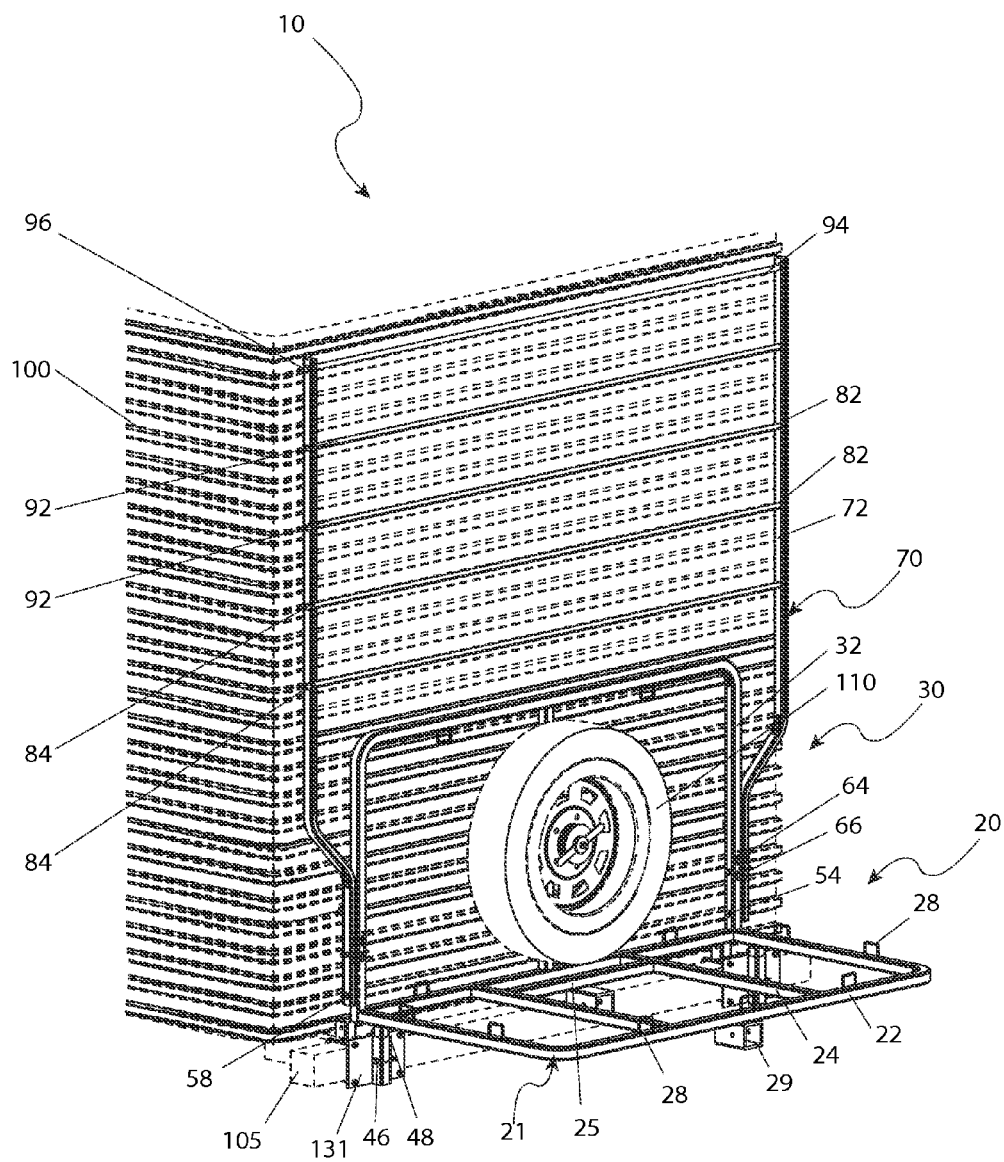
FIG. 7 is an environmental perspective view of a bumper mounting assembly 130 for the rack and clothes line combination for a recreational vehicle 10 in accordance with an alternate embodiment of the present invention; and, FIG. 8 is a detail, exploded view of the bumper mounting assembly 130 for the rack and clothes line combination for a recreational vehicle 10 in accordance with an alternate embodiment of the present invention.
Figure 8:
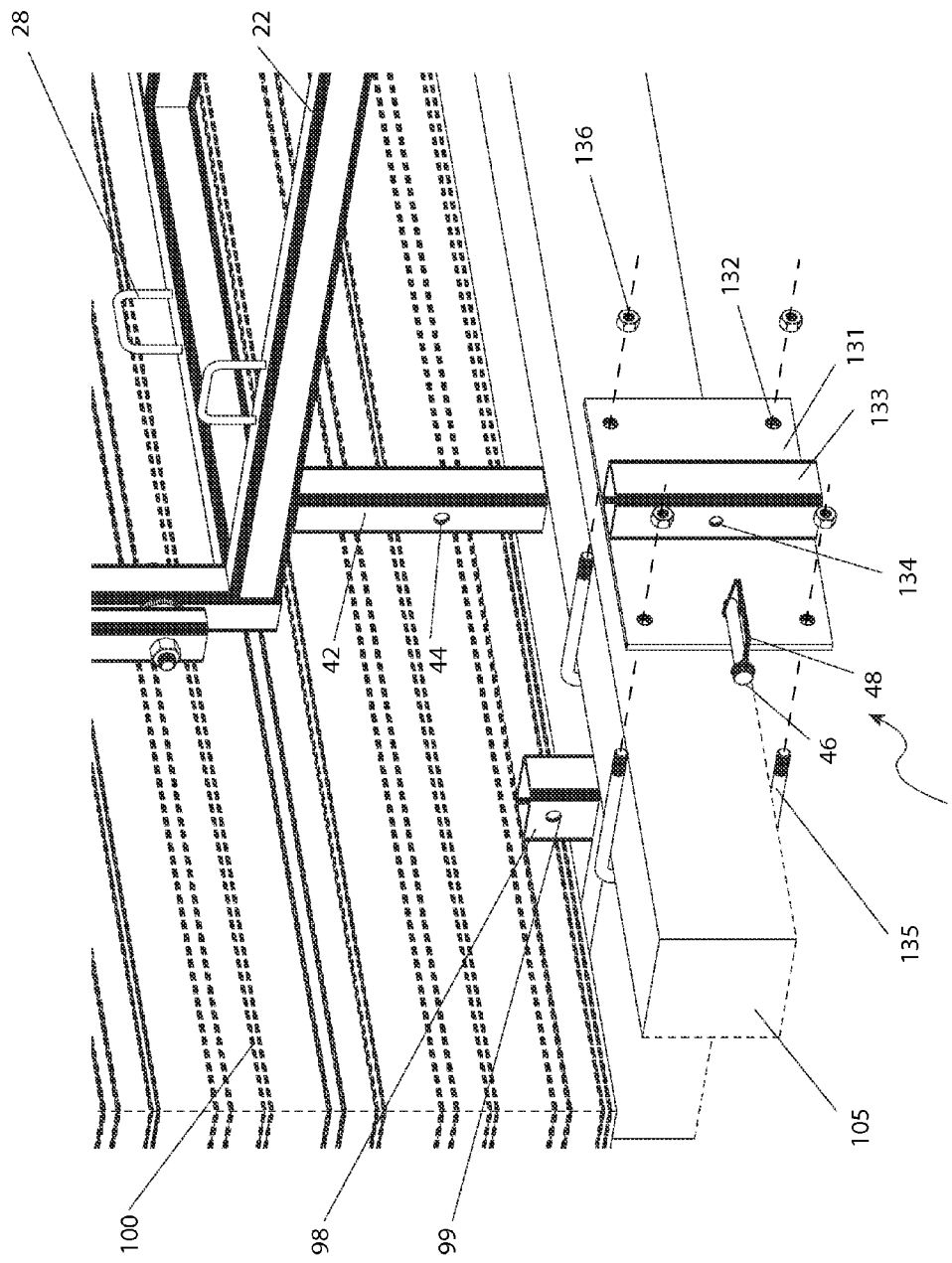

The best mode for carrying out the invention is presented in terms of its preferred embodiment, herein depicted within FIGS. 1 through 6b, and an alternate embodiment depicted within FIGS. 7 and 8. However, the invention is not limited to the described embodiment, and a person skilled in the art will appreciate that many other embodiments of the invention are possible without deviating from the basic concept of the invention and that any such work around will also fall under the scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a rack and clothes line combination (herein referred to as the "apparatus") 10, which provides a means to add a detachable rack 20, having a platform 21 and a back stop 30 to the exterior of a recreational vehicle 100, thereby increasing the area available to haul cargo. The rack 20 includes a vertical bar 34 to which a spare tire 110 can be secured. Attached to the rack 20 is a support assembly 70 that can be selectively deployed, by means of pivot joints, to suspend items 120 for drying. The preferred embodiment of the apparatus 10 is presented as a retrofit for an existing recreational vehicle 100, or camping trailer, to be installed by a qualified provider of such services. However, it can be seen that all or portions of the present apparatus 10 can be easily incorporated into the design of any recreational vehicle 100, or further adapted for installation on other vehicles, without limiting the scope of the invention. In the ensuing narrative, the abbreviation RV 100 will be used for the protracted terminology recreational vehicle 100, and said abbreviation RV 100 will further carry the implicit connotation of any other appropriately configured vehicle to which the apparatus 10 is chosen to be installed without limiting the extent or the scope of the invention. Furthermore, the terms "right", "left", "front", and "rear" are used consistent with the right, left, front, and back/rear directions of the vehicle to which the apparatus 10 may be attached.

Figure 2:
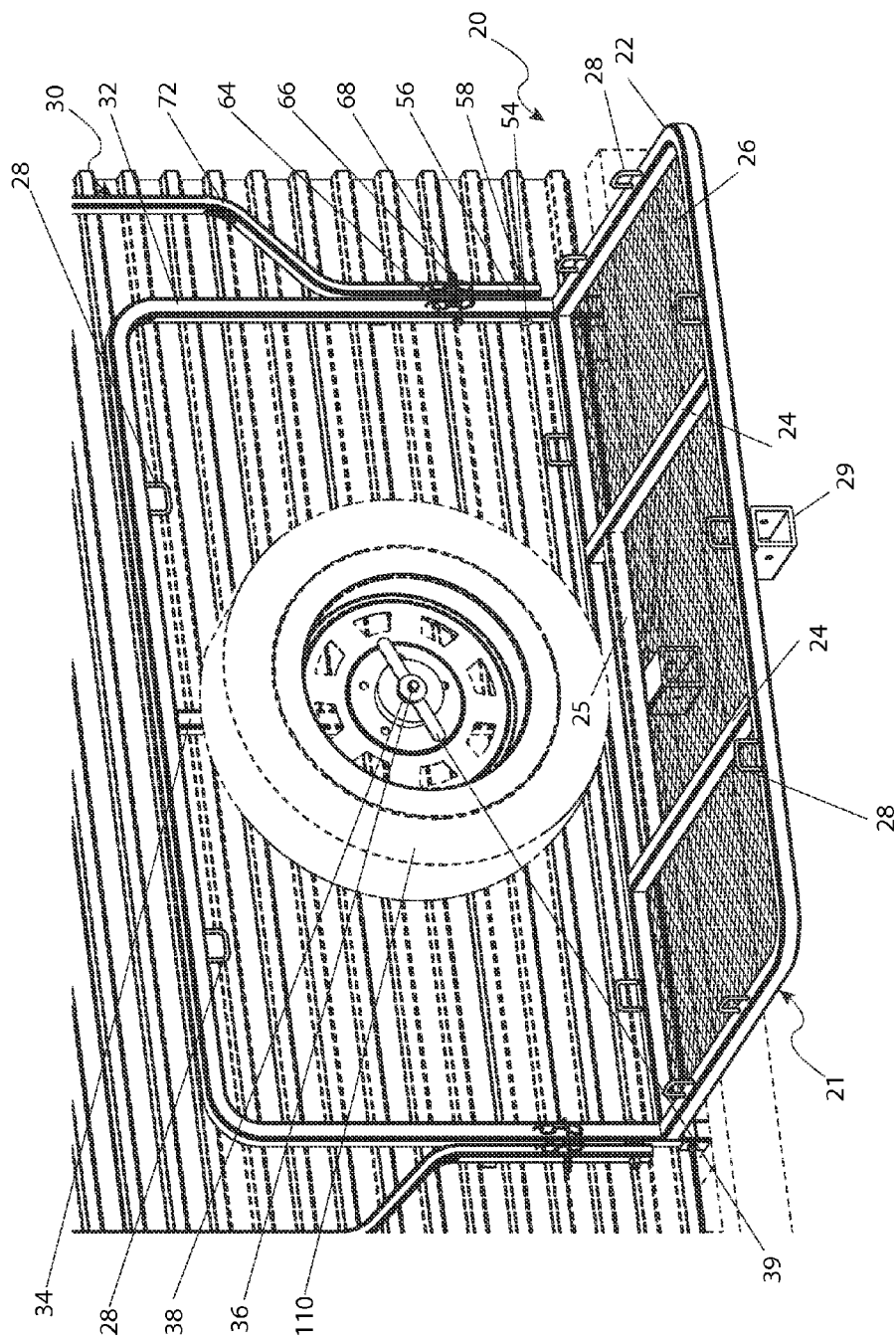
FIG. 2 is an enlarged view of selected portions of the rack and clothes line combination for a recreational vehicle 10 in accordance with the preferred embodiment of the present invention.
Figure 3:
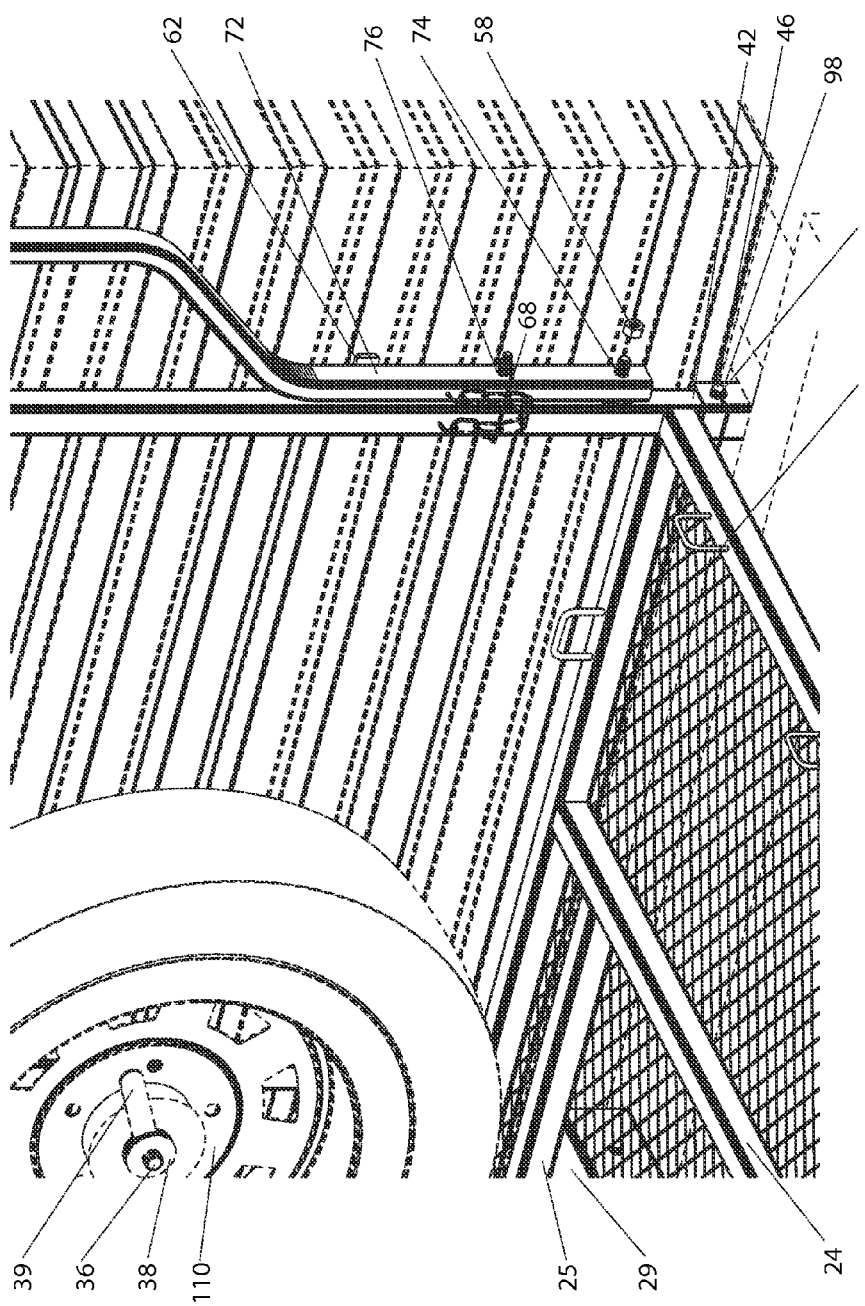
FIG. 3 is another enlarged view of selected portions of the rack and clothes line combination for a recreational vehicle 10 in accordance with the preferred embodiment of the present invention.

Referring now to FIGS. 1, 2, and 3, perspective and enlarged views of the apparatus 10, according to the preferred embodiment of the present invention, are disclosed. The apparatus 10 includes a rack 20 and a clothes line support structure 70. The rack 20 is preferably a unitary welded structure having a horizontal platform 21 and a vertical back stop 30 comprising square or rectangular steel tubing with a protective coating or plating to inhibit corrosion. It is understood that other materials and/or methods of construction, such as bolted joints, may be utilized without limiting the scope of the apparatus 10. The platform 21 preferably comprises a formed "C"-shaped platform frame 22 having intermediate lateral members 24 and a deck 26. A spanner tube 25 is placed between the lateral members 24, near the front side of the platform 21 for the attachment of a receiver hitch tube 29. The receiver hitch tube 29 is a piece of steel tubing that can accept a typical receiver-type hitch, as typically used in a trailer hitch, and is provided with at least one aperture to receive a retaining pin to secure the receiver-type hitch thereto. The receiver hitch tube 29 is attached to the underside of the platform frame 22. The platform frame 22 could alternately be constructed having square corners at the rear edge by abutting the members perpendicularly and joining the members with squared or mitered joints. The preferred embodiment has the beneficial effect of sealing all of the internal surfaces of the included members of the platform frame 22 against corrosion when the platform frame is properly welded to the back stop frame 32. Another receiver hitch tube 29 is also attached to the underside of the platform frame 22 at the rear thereof as a provision to permit the attachment of a towed load. This second receiver hitch tube 29 is configured in an identical manner as that of the first receive hitch tube 29. It may also be necessary to add some type of reinforcement provisions to the platform frame 22 in order to fortify the receiver hitch tubes 29, however, it is understood that any such eventualities do not modify the scope or intent of the present apparatus 10 and this preferred embodiment does not preclude any other embodiment. The deck 26 is preferably a piece of expanded metal sheeting configured to be attached to the lower surface, or alternately to the upper surface, of the platform frame 22. In the case of attachment to the lower side of the platform frame 22 certain openings may be necessary to provide clearance for the attachment of the receiver hitch tubes 29. Other materials, such as checkered steel plate, or treated wood, may be used in the construction of the deck 26 without limiting the scope of the apparatus 10. The attachment of the deck 26 to the lower surface of the platform frame 22 allows for the unencumbered attachment of a plurality of tie-down brackets 28 to the upper surface of the platform frame 22. The tie-down brackets 28 are preferably "C"-shaped formed rods affixed to the platform frame 22 at various locations to be used to secure cargo loads to the rack 20 with nylon straps or other suitable constraining devices. It is understood that the illustrated location or number of tie-down brackets 28 should not be interpreted as a limiting factor of the apparatus 10.

The back stop 30 preferably consists of a formed "D"-shaped rectangular back stop frame 32 with a centrally located vertical bar 34. The back stop frame 32 could alternately be constructed having square corners at the upper edge by abutting the members perpendicularly and joining the members with squared or mitered joints. The back stop frame 32 includes a horizontal member spanning the distance between the parallel vertical side members and located approximately five inches (5 in.) from the ends of the side members and in alignment with the platform frame 22 and the lateral members 24. This location of the lower horizontal member gives rise to defining the lower ends of the side members as mounting tubes 42. The mounting tubes 42 are inserted into mounting brackets 98 affixed to a rear frame member, or bumper 105 mounting member, of the RV 100 and secured with mounting pins 46 in order to attach the apparatus 10 to the RV 100. A discussion of the mounting brackets 98 will follow in subsequent text. This described pinned attachment method necessitates the disposition of aligned tube apertures (not shown) in the mounting tubes 42 to accommodate the insertion of the mounting pins 46. The preferred mounting pin 46 is a headed cylindrical pin with an integral pin retainer 48 pivotally attached at the head and wrapping around the exposed end.

A horizontal, rearward projecting threaded rod 36 is attached to the vertical bar 34 for the provisional eventuality of mounting a spare tire 110 to the rack 20. It may be necessary to add some type of reinforcement to the threaded rod 36 to increase the structural rigidity, however, it is understood that any such eventualities do not modify the scope or intent of the present apparatus 10 and this preferred embodiment does not preclude any other embodiment. A threaded clamp 38, generally being a cylindrical bracket configured to bring a clamping force to bear on the rim of the spare tire 110 to retain the spare tire 110 in a fixed position on the rack 20, is provided with a thread corresponding to that of the threaded rod 36. Disposed along the periphery of the threaded clamp 38 is at least one (1) handle 39 to provide a means to manipulate the threaded clamp 38 and to serve as a moment arm to induce a torque to bring about the required clamping force.

Other provisions included on the back stop frame 32, such as a first pivot aperture 52, a first latch aperture 65, an arm stop 62, and a support chain 64, relate to the clothes line support assembly 70 and will be included in that discussion. Moreover, there exists in the clothes line support assembly 70 a paired combination of all of the components (right and left), therefore, for the sake of clarity and simplicity, only the components on the right side of the support assembly 70 will be enumerated and discussed with the understanding that those identical, or in some cases mirrored, components exist on the left side and function in the same manner. The support assembly 70 includes a support arm 72 attached to the back stop frame 32 by means of a pivot pin 54 inserted first through the first pivot apertures 52 in the back stop frame 32, a spacer 56, and the second pivot apertures 74 disposed in the lower end of the support arm 72. A pivot pin retainer 58 secures the pivot pin 54. The pivot pin 54 is preferably comprised of a hex head bolt with a length of thread engaged into a prevailing torque, hex nut which serves as the pivot pin retainer 58. Other fastening devices may be utilized for the pivot pin 54 and pivot pin retainer 58, such as a headed pin retained with a deformed cotter pin, without limiting the scope of the apparatus 10. The spacer 56 is an annular disk configured to separate and prevent any interference between the back stop frame 32 and the support arm 72.

A short distance from the first pivot aperture 52 in the back stop frame 32 is a first latch aperture 65. An equal distance along the support arm 72 from the second pivot aperture 74 is a second latch aperture 76. When the support arm 72 is in the vertical position (fully raised), the second latch aperture 76 in the support arm 72 is in alignment with the first latch aperture 65 in the back stop frame 32 and the latch pin 66 may be inserted through the aligned apertures 65, 74 to secure the support arm 72 in that configuration. The latch pin 66 is preferably a headed cylindrical pin with an integral latch pin retainer 68 pivotally attached at the head and wrapping around the exposed end. When the latch pin 66 is removed from the apertures 65, 75, the support arm 72 may be lowered into a deployed position as seen in FIGS. 4 through 6b. An arm stop 62 is disposed along the front face of the back stop frame 32 at a short distance from the first latch aperture 65 to prevent the support arm 72 from going to an over-center position thus preventing support arm 72 from striking the RV 100. The arm stop 62 is preferably a metal bar welded, or otherwise permanently attached, to the back stop frame 32 and projecting to some distance so as to interfere with the further travel of the support arm 72 prior to latching the support arm 72 with the latching pin 66. A first end of a length of support chain 64, having some type of interconnected links, is permanently attached to the rear face of the back stop frame 32 in proximity to the arm stop 62. A second end of the support chain 65 is permanently attached to the rear face of the support arm 72. When the support arm 72 is held in the vertical latched configuration, the support chain 64 is slack and dangles below the attachment points, as illustrated more clearly in FIG. 3.

At a short distance from the second latch aperture 76, the support arm 72 is configured with an arm offset 76 such that the upper end of the support arm 72, the straight portion 79, is at a greater lateral distance from the back stop frame 32 than the lower end thereof. This arm offset 76 provides for a greater distance between the straight portions 79 of the support arms 72 on each side and therefore an increase in the space available to hang items 120 for drying. Disposed along the sides of the straight portion 79 is a plurality of evenly spaced, paired, first line apertures 82 and second line apertures 84. The first line apertures 82 are disposed along the face of the support arm 72 closer to the back stop frame 32. These first line apertures 82 are configured to be only slightly larger in diameter than the support lines 92 to which the items 120 for drying are suspended. The second line apertures 84 are disposed along the face of the support arm 72 farther from the back stop frame 32. These second line apertures 84 are configured to be slightly larger in diameter than the knot 93 securing the end of the support line 92. The support lines 92 are the clothes lines from which the items 120 for drying are to be suspended. The support lines 92 may be comprise of any material suitable for suspending the items 120, such as but not limited to, braided or twisted cotton rope, any textile or polymer compound coated with any other natural or synthetic material, or any other metallic, synthetic, or natural material, or combination thereof acceptable to a user. A support line 92 is preferably routed through a selected first line aperture 82 and then the corresponding second line aperture 84 whereupon a knot 93 is made in the support line 92. The knot 93 is then drawn into the support arm 72 through the second line aperture 84. The knot 93 should be of sufficient size to prohibit the passage thereof through the first line aperture 82. This procedure is then executed in the support arm 72 on the opposite side of the back stop frame 32 in such a manner so as to make the support line 92 taut. This procedure is then repeated for each support line 92 of the apparatus 10. The assembly of the support lines 92 may need to be performed prior to the assembly of the support arms 72 onto the pivot pins 54. The knot 93 may be the result of folding and intertwining the material of the support line 92 or it may involve the use of some other interference device which results in the proper securement of the support line 92 without limiting the scope of the apparatus 10.

Disposed near the upper end of the support arm 72, along the face toward the back stop frame 32, is a first tie rod aperture 86 as illustrated in FIG. 6b. Disposed on the opposite side of the support arm 72 is a second tie rod aperture 88. The first tie rod aperture 86 is slightly larger in diameter than the diameter of the tie rod 94 while the second tie rod aperture 88 is somewhat smaller in diameter. The second tie rod aperture 88 is sized to accommodate the tie rod retainer 96 as illustrated in FIG. 6a. The tie rod 92 is preferably a three-eighths inch (⅜ in.) schedule pipe; however, other materials, such as a tube or a cylindrical rod, may be utilized without limiting the scope of the apparatus 10. Threads can be cut in the inner diameter of the pipe such that a tie rod retainer 96 can be utilized to secure the tie rod 94 in the support arm 72. The tie rod 94 affixes the upper end of one (1) support arm 72 to the upper end of the other support arm 72 so that the two (2) can operate together as a support assembly 70.

The mounting brackets 98 preferably comprise steel tubing having the complementary geometric shape to receive the mounting tubes 42 of the rack 20. The mounting brackets 98 may alternately comprise square or rectangular tubing with any plate, or plates, inserted and attached therein to bring about the necessary shape to receive the mounting tubes 42. Disposed in the mounting brackets 98 are mounting bracket apertures 99, which can be aligned with the tube apertures (not shown) in the mounting tubes 42 in order to insert mounting pins 46 to attach the apparatus 10 to the RV 100. The mounting pins 48 are secured in the mounting bracket apertures 99 and the tube apertures (not shown) by a pin retainer 48 as previously discussed.

Figure 4:
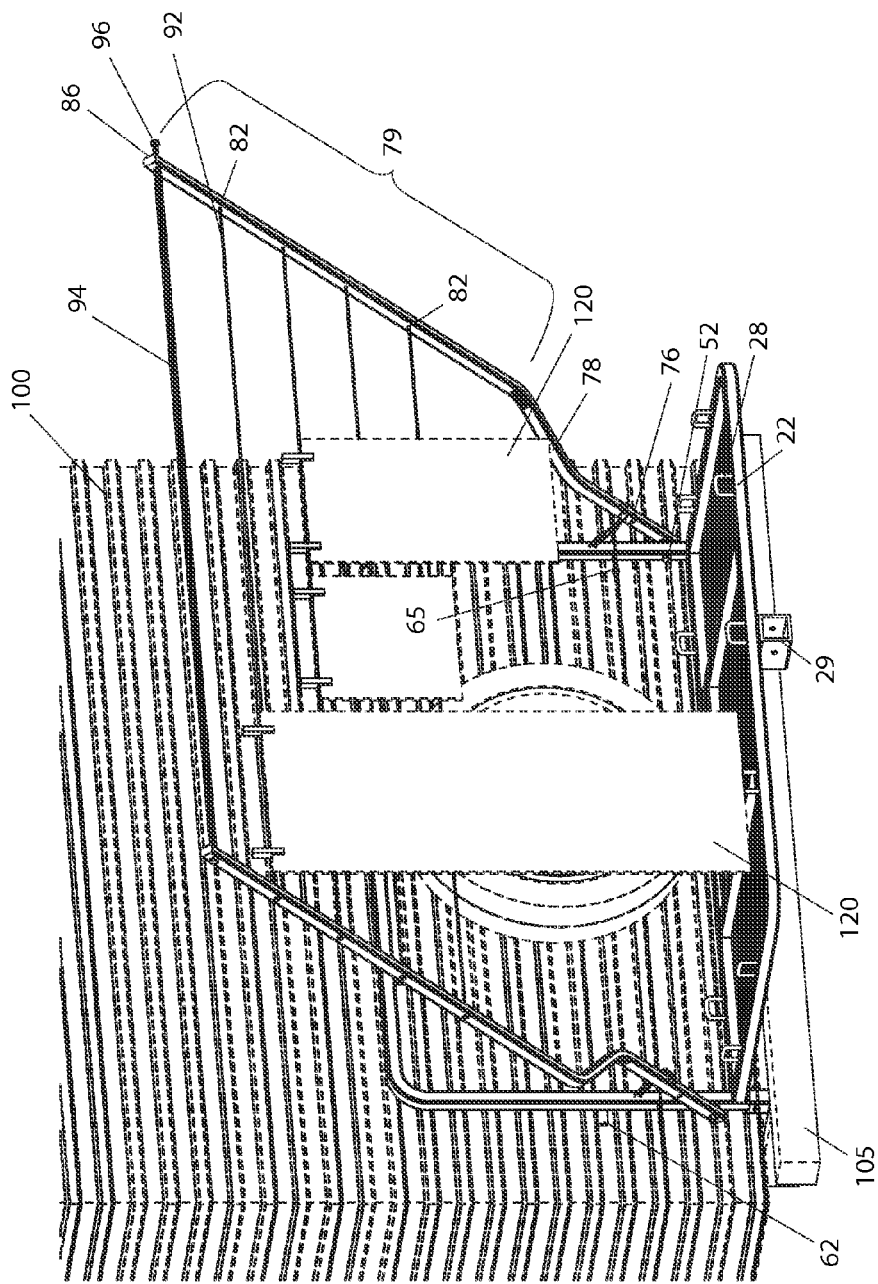
FIG. 4 is an environmental perspective view of the rack and clothes line combination for a recreational vehicle 10 depicted with the clothes line support assembly 70 in a deployed position in accordance with the preferred embodiment of the present invention.

Referring now to FIGS. 4 and 5, environmental perspective and enlarged views of the apparatus 10, in a deployed position, according to the preferred embodiment of the present invention, are disclosed. The latch pins 66 must, at a minimum, be retracted from the second latch apertures 76 of each support arm 72 in order to deploy the support assembly 70. The support arms 72 are rotated forward, turning about the pivot pins 54, and lowered to an angle of approximately forty five degrees (45°). In this configuration, the support chains 64 are drawn taut and the weight of the support arms 72 is transferred through the support chains 64 to the back stop frame 32. The latch pins can conveniently be stored in the respective first latch apertures 65 disposed in the back stop frame 32. The items 120 to be dried can then be suspended from the support lines 92 with user supplied clothes pins or other suitable clips.

Referring now to FIG. 7, an environmental perspective view of a bumper mounting assembly 130, and FIG. 8, a detail, exploded view of the bumper mounting assembly 130, of the apparatus 10, according to an alternate embodiment of the present invention, are disclosed. An alternate embodiment of the present apparatus 10 is configured to include a pair of bumper mounting assemblies 130 into which the rack 20 is fitted and secured with the mounting pins 46 as shown in FIG. 8. The mounting tubes 42 are moved several inches toward the rear of the platform frame 22 from the position as illustrated in the preferred embodiment (FIGS. 1 through 6b) and affixed to the platform frame 22 to compensate for the shift of position necessitated by the bumper mounting assemblies 130. Disposed in each mounting tube 42 is a tube aperture 44. Each bumper mounting assembly 130 includes a mounting plate 131 with a plurality of plate apertures 132 for the insertion of U-bolt 135 fasteners. Disposed on the mounting plate 131 is a central tube 133 into which the mounting tubes 42 are inserted. The central tube 133 is preferably a square tube of an appropriate size to accommodate the mounting tube 42 in a sliding fit. The central tube 133 is attached to the mounting plate 131 preferably by welding. Disposed in the central tube 133 is a pin aperture 134 for the insertion of a mounting pin 46.

The mounting plates 131 are located along the existing bumper 105 of the RV 100 such that the central tubes 133 are in alignment with the mounting tubes 42 of the alternate embodiment. The mounting plates are then affixed to the bumper 105 with the use of at least one (1) U-bolt 135 configured to surround a section of the bumper 105 and retained with a plurality of nuts 136. The mounting tubes 42 attached to the rack 20 are then slid into the central tubes 133 and secured with mounting pins 46 and pin retainers 48.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized in a simple and straightforward manner with little or no training. It must be realized, however, that because of the duality of purpose for the apparatus 10 a portion of the procedure for use in one (1) purpose is contra-indicative for the other purpose. The apparatus would be installed as indicated in FIG. 1 for transporting additional cargo lashed to the rack 20, while the full benefit of the clothes line support assembly 70 could be realized with the configuration as depicted in FIG. 4.

The method of installing and utilizing the apparatus 10 may be achieved by performing a series of steps. It can be appreciated that the operational steps described can be performed in alternative order and as such should not be viewed as a limiting factor. After initial purchase or acquisition of the apparatus 10, it is necessary that the mounting brackets 98 be installed onto the RV 100, either by the user or by a qualified provider of such services. The utilization of the rack 20 can be achieved by performing following steps: acquiring a model of the apparatus 10; installing the mounting brackets 98; lifting the rack 20 to install the mounting tubes 42 into the mounting brackets 98; inserting the mounting pins 46 into the aligned tube apertures and the mounting bracket apertures 99; securing the mounting pins 46 with the pin retainers 48; mounting a spare tire 110 to the threaded rod 36 on the vertical bar 34; securing the spare tire 110 with the threaded clamp 38; loading additional cargo as desired onto the rack 20 and securing the cargo with user provided lashings.

The utilization of the support assembly 70 can be achieved by performing the following steps having initially installed the apparatus onto the RV 100: removing any stowed cargo from the rack 20; removing a latch pin retainer 68 and the latch pin 66 from one (1) support arm 72; removing the latch pin retainer 68 and the latch pin 66 from the opposite support arm 72; lowering both support arms 72 simultaneously until all slack has been removed from the support chains 64 and the support chains 64 bear the full weight of the support arms 72; suspending the items 120 to be dried from the support lines 92 with user supplied clothes pins or clips.

The method of utilizing the alternate embodiment may be achieved by first installing the bumper mounting assemblies 131 as illustrated in FIG. 7. The utilization of the rack 20 and the clothes line support assembly 70 remains the same as the preferred embodiment.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A multipurpose rack, comprising:
   a back stop, comprising:
      a "D"-shaped frame having a front face, a rear face, a right side, a left side, an upper side, and a lower side;
   a support assembly, comprising:
      a first support arm having a first distal end and a first connection end pivotally engaged to said right side via a first pivot engagement; and,
      a second support arm having a second distal end and a second connection end pivotally engaged to said left side via a second pivot engagement;
      a tie rod removably attached to said first distal end and said second distal end and configured to span a length between said first and second support arms; and,
      at least one support line, each affixed to an intermediate position of said first support arm and to a subtending intermediate position of said second support arm so as to span a length between said first and second support arms;
      wherein at least one of said first support arm and said second support arm is curvilinear creating an offset such that a lateral distance between said first and second distal ends is greater than a lateral distance between said first and second connection ends;
   at least one support chain having a first end affixed to said "D"-shaped frame and a second end affixed to said support assembly and configured to arrest rotation of said support assembly to an acute angle relative to said "D"-shaped frame;
   at least one first latch aperture disposed in said "D"-shaped frame at a position selected from the group consisting of said left side and said right side;
   at least one second latch aperture disposed in said support assembly at a position selected from the group consisting of said first support arm and said second support arm;
   a latch pin having a latch pin head configured to insert through said first and second latch apertures, wherein each latch pin is provided with a latch pin retainer pivotally attached to said latch pin head, wherein each first latch aperture is configured to align with a second latch aperture when said support assembly is rotated to be substantially parallel with said back stop so as to enable insertion of an individual latch pin through said first and second latch apertures;

a vertical bar extending from said lower side to said upper side and positioned to be coplanar with said "D"-shaped frame;

a threaded rod extending perpendicularly from said vertical bar and adapted to bring a clamping force to bear on an object placed between said vertical bar and a threaded clamp configured to threadingly engage said threaded rod and retain said object therein;

at least one handle disposed along a periphery of said threaded clamp;

a platform, comprising:
   a platform frame extending perpendicularly from said "D"-shaped frame and having a "C"-shaped configuration; and,
   at least one platform lateral extending perpendicularly from said "D"-shaped frame, spanning a length between said "D"-shaped frame and said platform frame, and lying coplanar with said platform frame; and, a deck affixed to a surface of said platform frame;

wherein said first and second pivot engagements each comprise:
   a pivot pin having a pivot pin retainer for each pivot engagement; and,
   a spacer for each pivot engagement;
   wherein a first pivot pin is inserted between first pivot apertures of said first support arm and said right side and held in place by said pivot pin retainer;
   wherein a second pivot pin is inserted between second pivot apertures of said second support arm and said left side and held in place by said pivot pin retainer;
   wherein a first spacer is received by said first pivot pin and situated between said first support arm and said right side; and
   wherein a second spacer is received by said second pivot pin and situated between said second support arm and said left side.

2. The multipurpose rack recited in claim 1, further comprising at least one arm stop disposed on said front face of at least one side selected from the group consisting of said left side and said right side and configured to arrest rotation of said support assembly so that said support assembly does not rotate beyond a geometric plane defined by said front face.

3. The multipurpose rack recited in claim 1, further comprising at least one tie-down bracket disposed on at least one of said platform frame and said "D"-shaped frame.

4. A multipurpose rack, comprising:
a back stop, comprising:
   a "D"-shaped frame having a front face, a rear face, a right side, a left side, an upper side, and a lower side;
   at least two mounting tubes disposed on a lower surface of said lower side, each having mounting tube apertures;
   at least two mounting brackets adapted to be affixed to a portion of an ancillary vehicle, wherein each individual mounting bracket has mounting bracket apertures and is configured to receive an individual mounting tube such that said mounting tube apertures and said mounting bracket apertures align upon receipt of said mounting tube;
   a mounting pin for each of said aligned mounting tube apertures and said mounting bracket apertures, each configured to insert through said aligned mounting tube apertures and said mounting bracket apertures, wherein each mounting pin is provided a mounting pin head with a an integral mounting pin retainer pivotally attached thereto;

a support assembly, comprising:
   a first support arm having a first distal end and a first connection end pivotally engaged to said right side via a first pivot engagement;
   a second support arm having a second distal end and a second connection end pivotally engaged to said left side via a second pivot engagement;
   a tie rod removably attached to said first distal end and said second distal end and configured to span a length between said first and second support arms; and,
   at least one support line, each affixed to an intermediate position of said first support arm and to a subtending intermediate position of said second support arm so as to span a length between said first and second support arms;

a platform, comprising:
   a platform frame extending perpendicularly from said "D"-shaped frame and having a "C"-shaped configuration with a rear platform end;
   at least two platform laterals, each extending perpendicularly from said "D"-shaped frame, spanning a length between said "D"-shaped frame and said rear platform end, and lying coplanar with said platform frame;
   a spanner tube extending between each platform lateral;
   a first receiver hitch tube affixed to a bottom surface of said spanner tube and adapted to receive a first ancillary receiver-type hitch of a said ancillary vehicle, wherein said first receiver hitch tube has at least one first receiver hitch tube aperture; and,
   a second receiver hitch tube affixed to a bottom surface of said platform frame at said rear platform end and adapted to receive a second ancillary receiver-type hitch of an ancillary vehicle in-tow, wherein said second receiver hitch tube has at least one second receiver hitch tube aperture; and, a deck affixed to a surface of said platform frame.

5. The multipurpose rack recited in claim 4, wherein said first and second pivot engagements between said first support arm and said right side and between said second support arm and said left side comprise:
   a pivot pin having a pivot pin retainer for each pivot engagement; and,
   a spacer for each pivot engagement;
   wherein a first pivot pin is inserted between first pivot apertures of said first support arm and said right side and held in place by said pivot pin retainer;
   wherein a second pivot pin is inserted between second pivot apertures of said second support arm and said left side and held in place by said pivot pin retainer;
   wherein a first spacer is received by said first pivot pin and situated between said first support arm and said right side; and,
   wherein a second spacer is received by said second pivot pin and situated between said second support arm and said left side.

6. The multipurpose rack recited in claim 4, further comprising:

at least one first latch aperture disposed in said "D"-shaped frame at a position selected from the group consisting of said left side and said right side;

at least one second latch aperture disposed in said support assembly at a position selected from the group consisting of said first arm and said second arm; and, a latch pin having a latch pin head for each first and second latch aperture configured to insert through said first and second latch apertures, wherein each latch pin is provided with a latch pin retainer pivotally attached to said latch pin head;

wherein each first latch aperture is configured to align with a second latch aperture when said support assembly is rotated to be substantially parallel with said back stop so as to enable insertion of an individual latch pin through said first and second latch apertures.

7. The multipurpose rack recited in claim 4, further comprising at least one arm stop disposed on said front face of at least one side selected from the group consisting of said left side and said right side and configured to arrest rotation of said support assembly so that said support assembly does not rotate beyond a geometric plane defined by said front face.

8. The multipurpose rack recited in claim 4, further comprising at least one support chain having a first end affixed to said "D"-shaped frame and a second end affixed to said support assembly and configured to arrest rotation of said support assembly to an acute angle relative to said "D"-shaped frame.

9. The multipurpose rack recited in claim 4, further comprising:

a vertical bar extending from said lower side to said upper side and positioned to be coplanar with said "D"-shaped frame;

a threaded rod extending perpendicularly from said vertical bar;

a threaded clamp configured to threadingly engage said threaded rod; and, at least one handle disposed along a periphery of said threaded clamp;

wherein said threaded clamp is adapted to bring a clamping force to bear on an object placed between said vertical bar and said threaded clamp; and, wherein said threaded clamp and said vertical bar are configured to retain said object when said clamping force is applied.

10. The multipurpose rack recited in claim 4, wherein at least one of said first support arm and said second support arm is curvilinear creating an offset such that a lateral distance between said first and second distal ends is greater than a lateral distance between said first and second connection ends.

11. The multipurpose rack recited in claim 4, further comprising at least one tie-down bracket disposed on at least one of said platform frame and said "D"-shaped frame.

12. A multipurpose rack, comprising:
a back stop, comprising:
a "D"-shaped frame having a front face, a rear face, a right side, a left side, an upper side, and a lower side;
a support assembly, comprising:
a first support arm having a first distal end and a first connection end pivotally engaged to said right side via a first pivot engagement;
a second support arm having a second distal end and a second connection end pivotally engaged to said left side via a second pivot engagement;
a tie rod removably attached to said first distal end and said second distal end and configured to span a length between said first and second support arms; and,
at least one support line, each affixed to an intermediate position of said first support arm and to a subtending intermediate position of said second support arm so as to span a length between said first and second support arms;
a platform, comprising:
a platform frame extending perpendicularly from said "D"-shaped frame and having a "C"-shaped configuration with a rear platform end;
at least two platform laterals, each extending perpendicularly from said "D"-shaped frame, spanning a length between said "D"-shaped frame and said rear platform end, and lying coplanar with said platform frame;
a spanner tube extending between each platform lateral;
a first receiver hitch tube affixed to a bottom surface of said spanner tube and adapted to receive a first ancillary receiver-type hitch of a said ancillary vehicle, wherein said first receiver hitch tube has at least one first receiver hitch tube aperture;
a second receiver hitch tube affixed to a bottom surface of said platform frame at said rear platform end and adapted to receive a second ancillary receiver-type hitch of an ancillary vehicle in-tow, wherein said second receiver hitch tube has at least one second receiver hitch tube aperture; and,
at least two mounting tubes disposed on a lower surface of said platform frame, each having mounting tube apertures;
at least two bumper mounting assemblies, each comprising:
a bumper plate having a central tube, at least one central tube pin aperture disposed through said central tube, and a plurality of bumper plate apertures, wherein an individual central tube is configured to receive an individual mounting tube such that said mounting tube apertures and said central tube apertures align upon receipt of said mounting tube;
a U-bolt fastener, each having threaded ends and configured to surround a section of a bumper of said ancillary vehicle so that said threaded ends insert through said bumper plate apertures;
a plurality of threaded nuts, each configured to threadingly engage an individual threaded end of said U-bolt fastener; and,
a bumper mounting assembly mounting pin for each of said aligned mounting tube apertures and central tube apertures configured to insert through said aligned mounting tube apertures and central tube apertures, wherein each bumper mounting assembly mounting pin is provided with a bumper mounting assembly mounting pin retainer; and,
a deck affixed to a surface of said platform frame.

13. The multipurpose rack recited in claim 12, wherein said first and second pivot engagements between said first support arm and said right side and between said second support arm and said left side comprise:
a pivot pin having a pivot pin retainer for each pivot engagement; and,
a spacer for each pivot engagement;
wherein a first pivot pin is inserted between first pivot apertures of said first support arm and said right side and held in place by said pivot pin retainer;

wherein a second pivot pin is inserted between second pivot apertures of said second support arm and said left side and held in place by said pivot pin retainer;

wherein a first spacer is received by said first pivot pin and situated between said first support arm and said right side; and, wherein a second spacer is received by said second pivot pin and situated between said second support arm and said left side.

14. The multipurpose rack recited in claim 12, further comprising:

at least one first latch aperture disposed in said "D"-shaped frame at a position selected from the group consisting of said left side and said right side;

at least one second latch aperture disposed in said support assembly at a position selected from the group consisting of said first arm and said second arm; and, a latch pin having a latch pin head for each first and second latch aperture configured to insert through said first and second latch apertures, wherein each latch pin is provided with a latch pin retainer pivotally attached to said latch pin head;

wherein each first latch aperture is configured to align with a second latch aperture when said support assembly is rotated to be substantially parallel with said back stop so as to enable insertion of an individual latch pin through said first and second latch apertures.

15. The multipurpose rack recited in claim 12, further comprising at least one arm stop disposed on said front face of at least one side selected from the group consisting of said left side and said right side and configured to arrest rotation of said support assembly so that said support assembly does not rotate beyond a geometric plane defined by said front face.

16. The multipurpose rack recited in claim 12, further comprising at least one support chain having a first end affixed to said "D"-shaped frame and a second end affixed to said support assembly and configured to arrest rotation of said support assembly to an acute angle relative to said "D"-shaped frame.

17. The multipurpose rack recited in claim 12, further comprising:

a vertical bar extending from said lower side to said upper side and positioned to be coplanar with said "D"-shaped frame;

a threaded rod extending perpendicularly from said vertical bar;

a threaded clamp configured to threadingly engage said threaded rod; and, at least one handle disposed along a periphery of said threaded clamp;

wherein said threaded clamp is adapted to bring a clamping force to bear on an object placed between said vertical bar and said threaded clamp; and, wherein said threaded clamp and said vertical bar are configured to retain said object when said clamping force is applied.

18. The multipurpose rack recited in claim 12, wherein at least one of said first support arm and said second support arm is curvilinear creating an offset such that a lateral distance between said first and second distal ends is greater than a lateral distance between said first and second connection ends.

19. The multipurpose rack recited in claim 12, further comprising at least one tie-down bracket disposed on at least one of said platform frame and said "D"-shaped frame.

* * * * *